Figure 1:
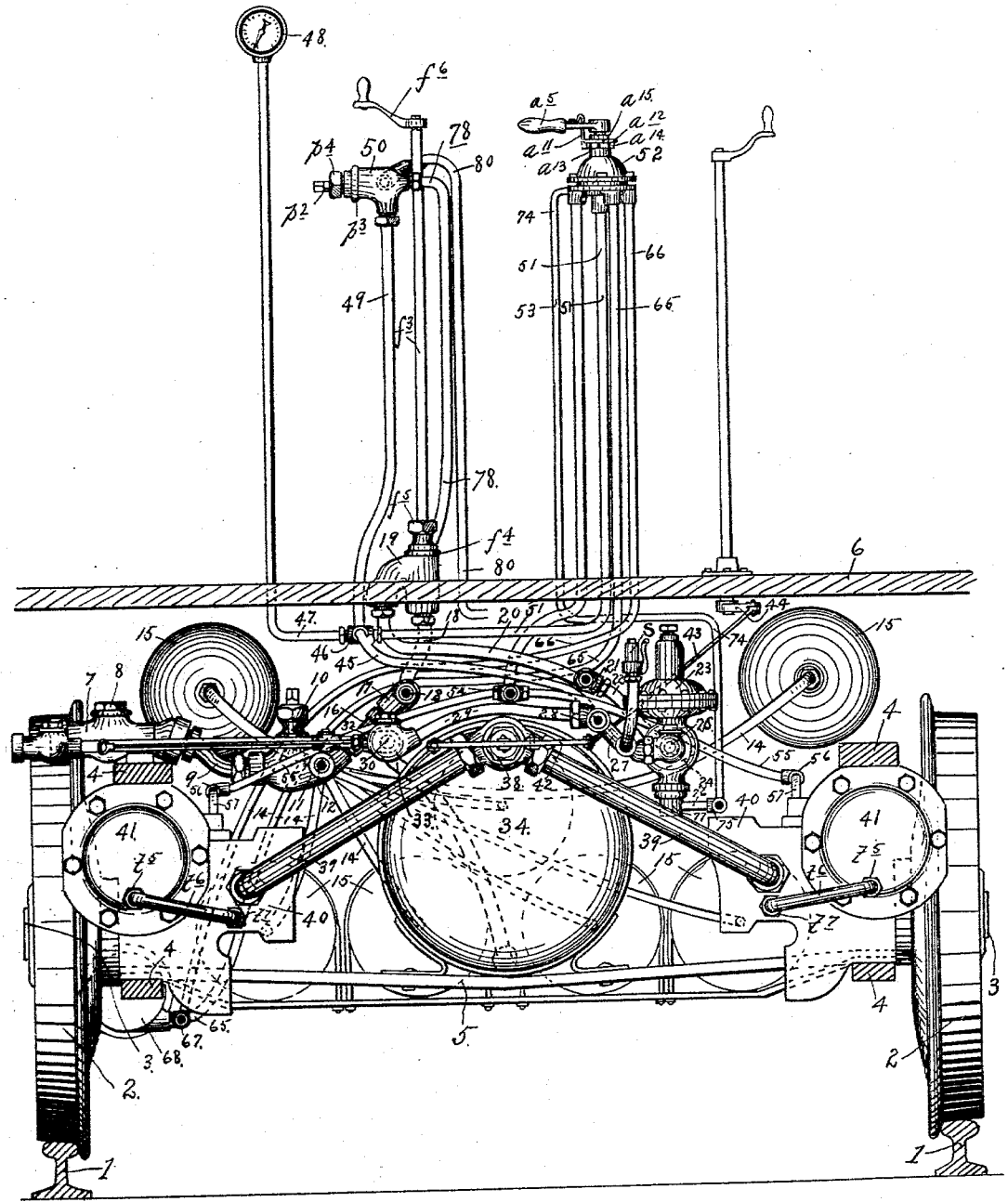

(No Model.)  
9 Sheets—Sheet 2.

R. HARDIE.
AIR STORAGE MOTOR CAR.

No. 584,146.  
Patented June 8, 1897.

Fig. 2.

Witnesses.  
C. F. Kilgore  
P. D. Merchant

Inventor  
Robert Hardie  
By his Attorney  
Jas. F. Williamson (No Model.) 9 Sheets—Sheet 3.
R. HARDIE.
AIR STORAGE MOTOR CAR.
No. 584,146. Patented June 8, 1897.
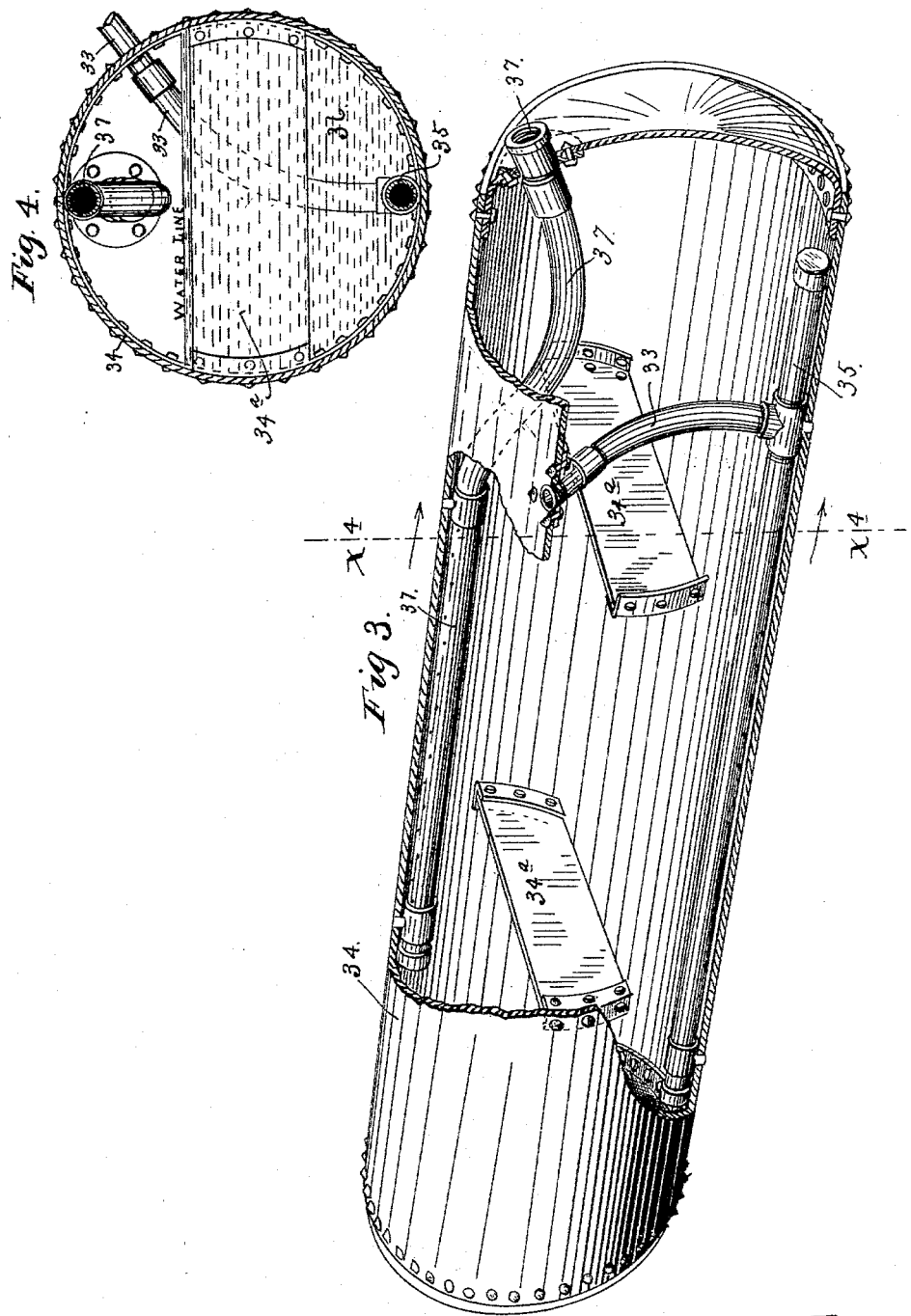
Witnesses.
C. F. Kilgore
R. D. Merchant
Inventor:
Robert Hardie
By his Attorney
Jas. F. Williamson

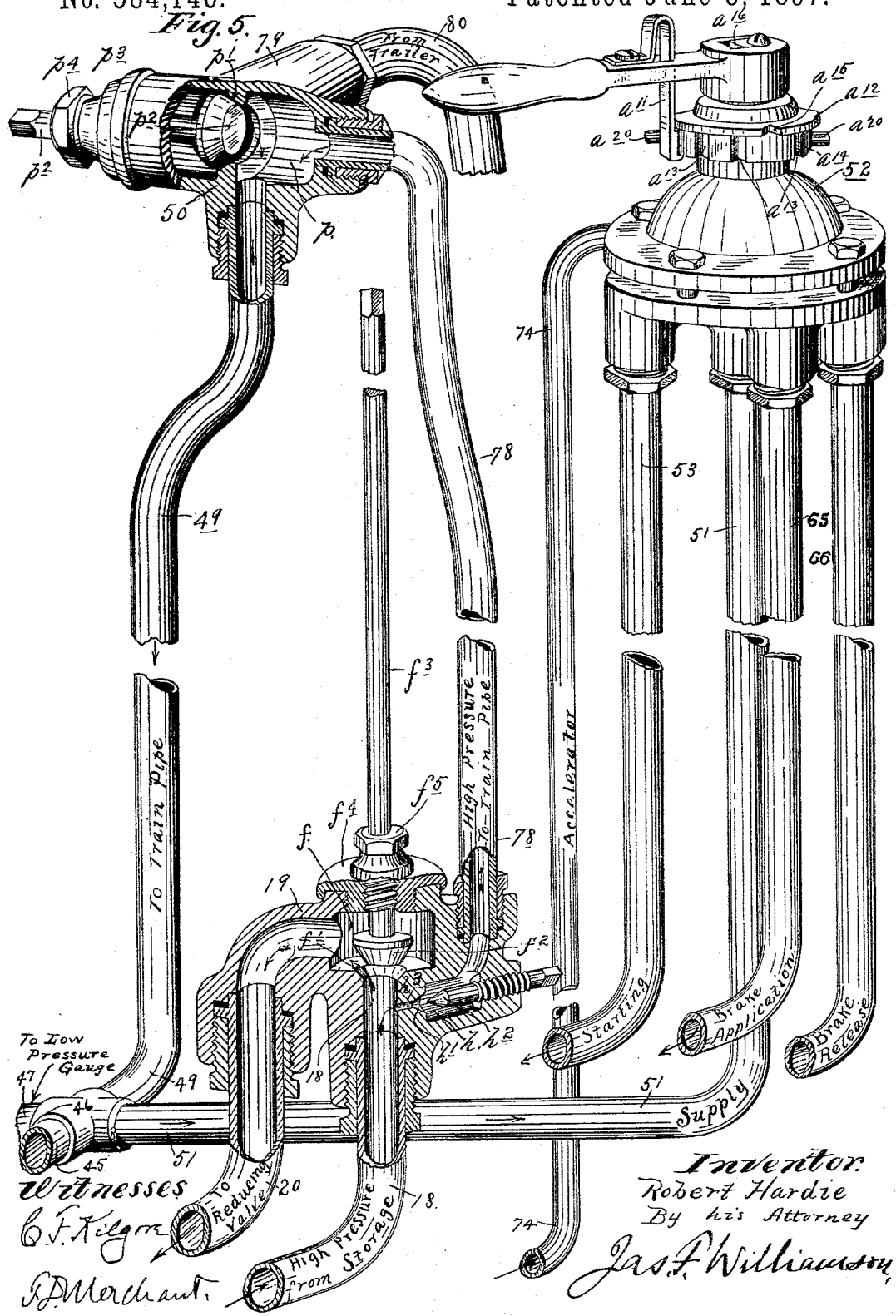

(No Model.) 9 Sheets—Sheet 5.
R. HARDIE.
AIR STORAGE MOTOR CAR.
No. 584,146. Patented June 8, 1897.
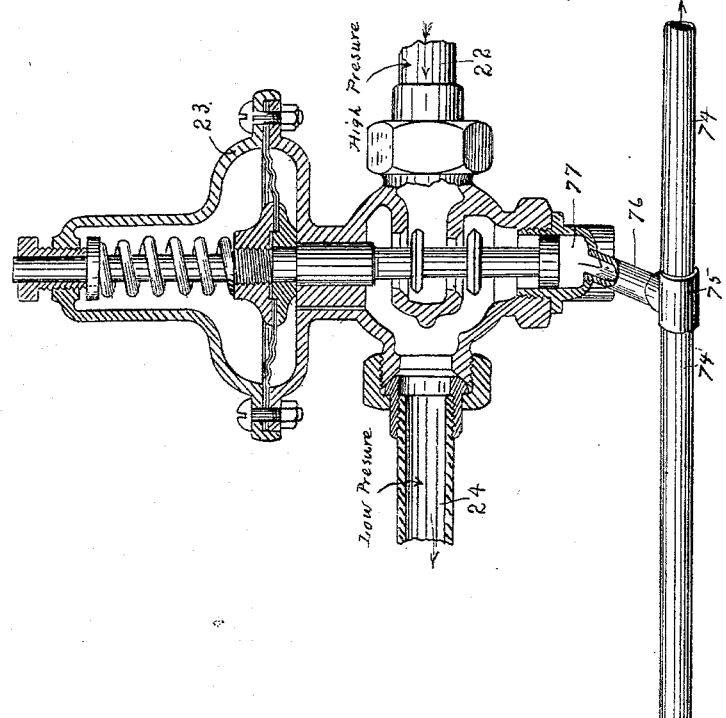
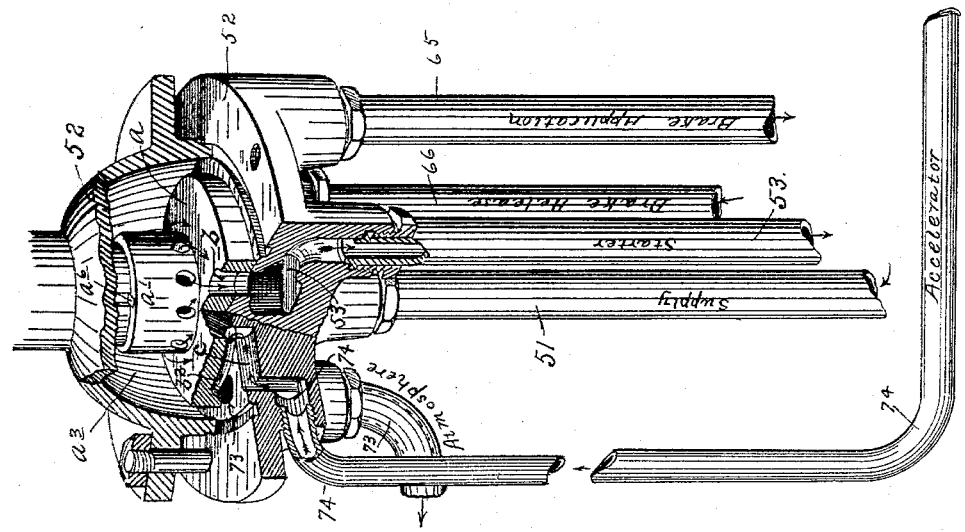
Fig. 6.
Witnesses.
C. F. Kilgore
F. D. Merchant
Inventor.
Robert Hardie
By his Attorney
Jas. F. Williamson

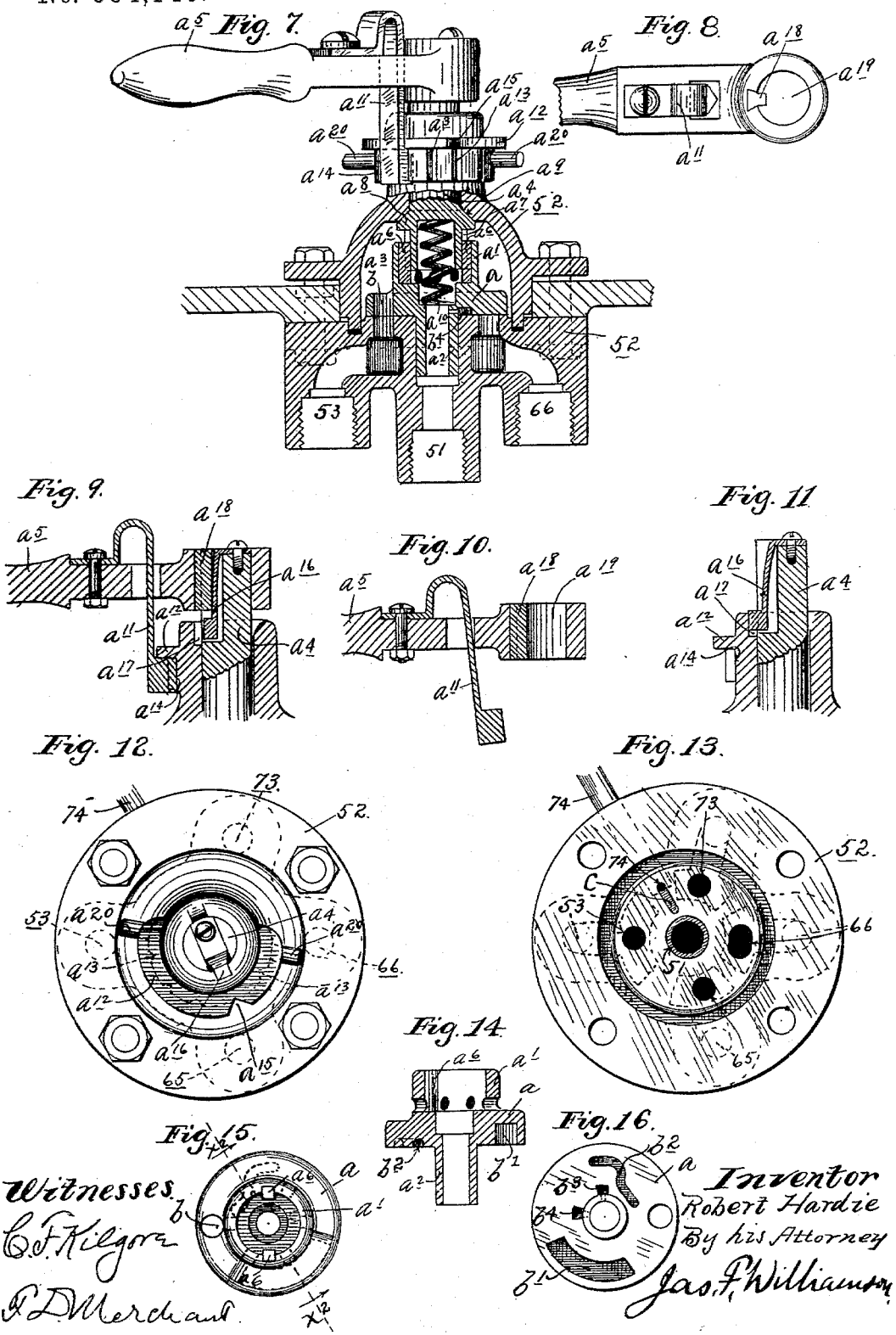

(No Model.) 9 Sheets—Sheet 7.
R. HARDIE.
AIR STORAGE MOTOR CAR.
No. 584,146. Patented June 8, 1897.
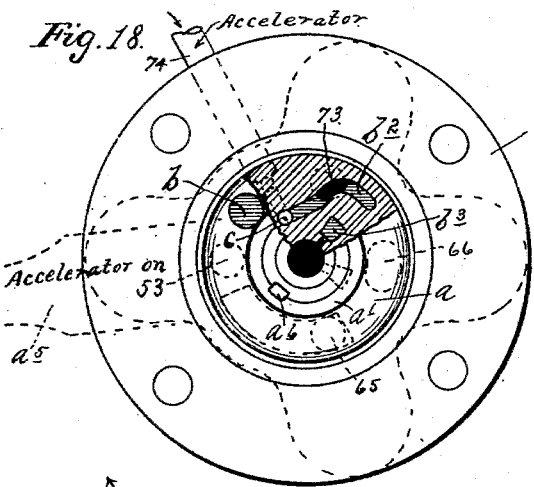
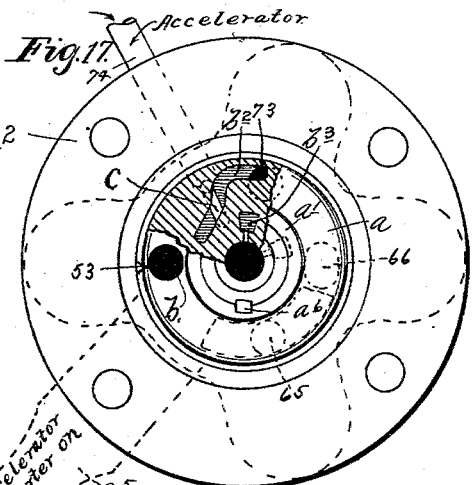
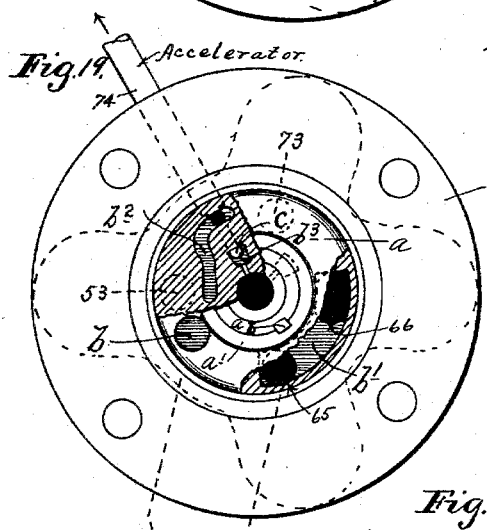
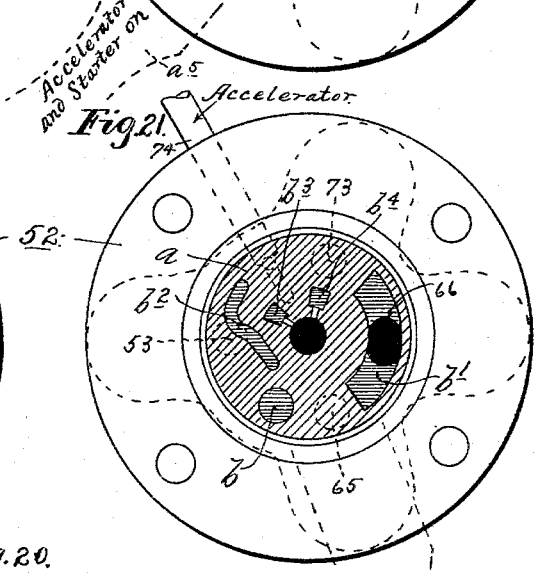
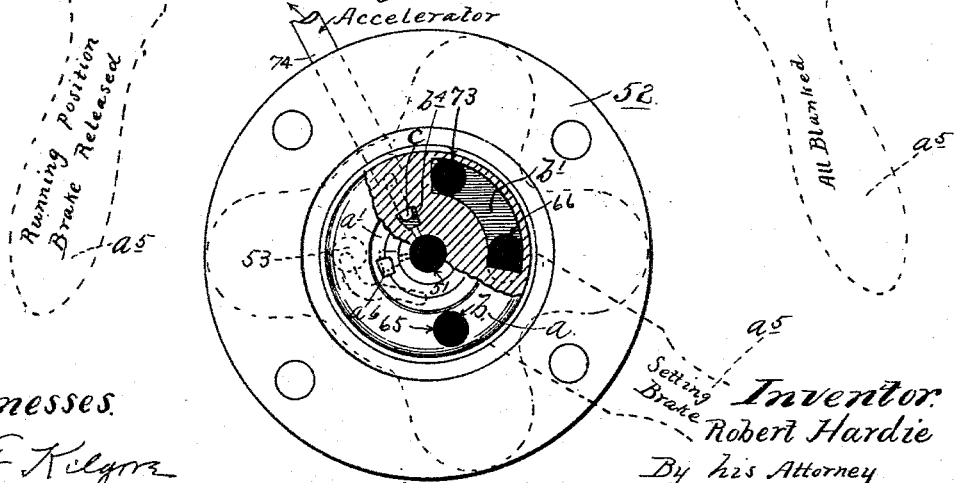
Witnesses.
C. F. Kilgore
F. A. Merchant
Inventor.
Robert Hardie
By his Attorney
Jas. F. Williamson (No Model.) 9 Sheets—Sheet 8.
R. HARDIE.
AIR STORAGE MOTOR CAR.

No. 584,146. Patented June 8, 1897.

Witnesses
C F Kilgore
P D Merchant

Inventor
Robert Hardie.
By his Attorney,
Jas. F. Williamson (No Model.) 9 Sheets—Sheet 9.

R. HARDIE.
AIR STORAGE MOTOR CAR.

No. 584,146. Patented June 8, 1897.

Witnesses.
C. F. Kilym
K. D. Merchant.

Inventor.
Robert Hardie
By his Attorney
Jas. F. Williamson

UNITED STATES PATENT OFFICE.

ROBERT HARDIE, OF ROME, NEW YORK, ASSIGNOR TO THE GENERAL COMPRESSED AIR COMPANY, OF NEW YORK, N. Y.

AIR-STORAGE MOTOR-CAR.

SPECIFICATION forming part of Letters Patent No. 584,146, dated June 8, 1897.

Application filed September 2, 1896. Serial No. 604,621. (No model.)

*To all whom it may concern:*

Be it known that I, ROBERT HARDIE, a citizen of the United States, residing at Rome, in the county of Oneida and State of New York, have invented certain new and useful Improvements in Air-Storage Motor-Cars; and I do hereby declare the following to be a full, clear, and exact description of the invention, such as will enable others skilled in the art to which it appertains to make and use the same.

My invention relates to air-storage motor-cars or locomotives; and has for its object to improve the construction with a view of better control and increased efficiency.

To these ends the invention consists of the novel devices and combinations of devices hereinafter described, and defined in the claims.

The features of invention herein disclosed are in the nature of improvements on the air-motor car or locomotive disclosed in my pending application, Serial No. 553,950, filed June 25, 1895, entitled "Air-storage motor-cars."

Many of the features of construction herein described are identical with the construction disclosed in my above-identified pending application.

The features of improvement may be briefly indicated as follows:

First. A reduction-valve or fluid-pressure regulator is employed with connections which are controllable at will for rendering air at increased or higher than normal pressure available in the working system or main supply connections to the engines whenever necessary or desirable for starting the car, for acceleration of speed, or for moving a heavy load on a steep grade.

Second. The supplemental supply or starting connections and the brake-operating connections disclosed in my previous application, together with said increased pressure connections or accelerating connections just above noted as disclosed herein, are all under the control of a common or combination valve operated by a single lever within convenient reach of the motorman on the car-platform. By this combination-valve the supplemental supply or starting connections may be established at the increased pressure, and then as quickly as the engines have been started the supplemental supply connections may be cut off, while maintaining the increased pressure or accelerating connections, if necessary, for "picking up" or getting the car under full speed. Otherwise stated, the starter and the accelerator are capable of conjoint use or the accelerator may be used without using the starter.

Third. Platform or shut-off valves are provided through which the high-pressure air must normally pass on its road to the reduction-valve, whereby the high-pressure air may be confined within the storage system behind said valves at will.

Fourth. Auxiliary valves are provided for tapping said high-pressure system on the storage side of said shut-off valves for obtaining a supply upon emergency, as for running home after accident or mishap to the reduction-valve or other parts of the normal connections. A safety-valve is used as a part of the auxiliary system for insuring safety in the use of the same.

Fifth. A train-valve is provided for utilizing storage on a trailer-car, if desired.

Sixth. A cushion-reservoir is provided in the low-pressure or working system for affording an extra supply to meet sudden variations in load on the engine.

Seventh. Cylinder relief-valves with piping back to the valve-chests of the car-driving engines or motors are provided for taking care of the water of condensation in the cylinders without objectionable noise.

Eighth. A hot-water air-reheater is provided of improved construction for doing its required work without admitting water to the throttle-pipes.

With these statements in mind it is thought that it will be easier to follow the detailed description of the mechanism.

The invention is illustrated in the accompanying drawings, wherein, like notations referring to like parts throughout the several views—

Figure 26:
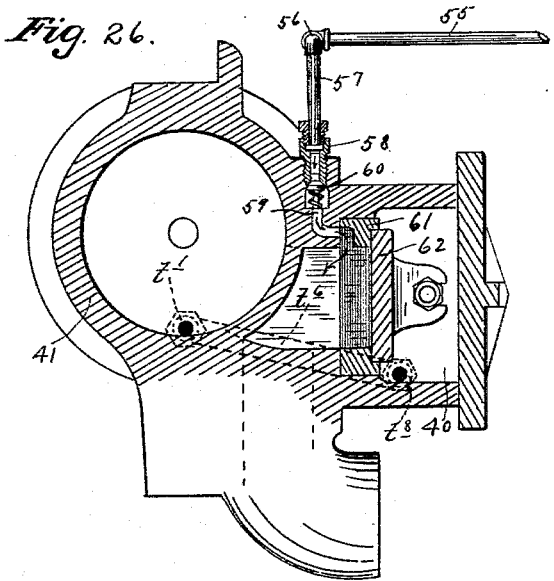
Figure 27:
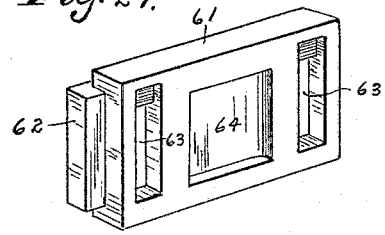

Figure 1 is a view of the motor-car, with some parts removed and others broken away, showing the mechanism, partly in elevation and partly in transverse vertical section, on the line $x'\ x'$ of Fig. 2. Fig. 2 is a diagram view, more or less distorted, chiefly in plan, but with some parts removed, others broken away, and others shown in horizontal section, illustrating the storage and piping system detached from the car. Fig. 3 is a detail in perspective, with some parts broken away and others in section, showing the hot-water air-reheater detached. Fig. 4 is a vertical cross-section on the line $x^4 x^4$ of Fig. 3. Fig. 5 is a perspective view, with some parts broken away and others in section, showing the platform-valve, the train-valve, and the combination-valve. Fig. 6 is a perspective view, with some parts broken away and others shown in section, for illustrating the relation of the said combination-valve to the fluid-pressure regulator or reduction-valve in the main-supply connections. Figs. 7 to 16, inclusive, are details illustrating the different parts of the so-called "combination-valve." Figs. 17 to 21 are views, partly in diagram, for illustrating the actions of the combination-valve when the valve occupies the several different positions shown. Figs. 22 to 25, inclusive, are details illustrating the cylinder relief-valves and the piping therefrom to the valve-chest. Figs. 26 and 27 are details illustrating the relation of the supplemental supply or starting connections to the distribution-valves of the car-driving motors or engines.

Referring to Fig. 1, the numeral 1 represents the track-rails, 2 the wheels, and 3 the axle of one pair of the motor-trucks. The numerals 4 and 5 represent parts of the truck-frame, and 6 represents a part of one of the car-platforms.

Referring to Fig. 2, the general arrangement of the piping can perhaps be most briefly indicated by tracing the course of the air from the point of entrance to the storage system to the point of application in the engines or car-driving motors. In charging the car from the local charging-station or power plant (not shown) the air enters through a receiving-nozzle 7, equipped with a check-valve 8, and passes thence through pipe-section 9, equipped with a shut-off valve or stop-cock 10, to a fitting 11. Thence the air passes through pipe-sections 12 to fittings 13. Thence, through branch pipes 14, the air passes to the multiplicity of storage-reservoirs 15, located in convenient positions on the truck and car frames. After the storage-reservoirs have been charged to the desired pressure, which is usually about two thousand pounds to the square inch, the stop-cock or shut-off valve 10 is turned into its closed position. The car is then ready for use.

From the high-pressure-storage system above noted—to wit, from the reservoirs 15—the high-pressure air can pass back through the pipe-sections 12 to the fitting 11 and thence through branch pipe 16 to a fitting 17 and through the same to pipe-sections 18, leading to what may be called the "platform" or "auxiliary" valves 19. From the valves 19 the high-pressure air passes through pipe-sections 20 to a fitting 21 and thence through a pipe-section 22 to the reducing-valve or fluid-pressure regulator 23. By said reducing-valve or fluid-pressure regulator 23 the air is passed at the desired reduced pressure into the low-pressure or working system. From said reducing-valve 23 the low or working pressure air passes through pipe-section 24, through fitting 25 and check-valve 26 to pipe-section 27, fitting 28, pipe-section 29, check-valve 30, pipe-section 31, fitting 32, and pipe-section 33, into the hot-water reheater 34. The pipe-section 33, leading into the reheater casing or shell 34, taps a perforated distributing-pipe 35, located near the bottom of the shell 34 and having its perforations arranged to discharge downward and outward, as best shown in Figs. 3 and 4. Thence the air passes upward through the hot water 36, thereby becoming reheated and charged to some extent with moisture and steam. The moistened and heated air then passes into a perforated collecting-pipe 37, located at the top or near the top of the shell 34, with its perforations arranged to receive from above. The shell 34 is provided with baffle-plates $34^a$ for reducing the splash within the shell under the motion of the car. One end of the pipe 37 passes out through the top or end wall of the shell 34 and connects with the throttle-valve 38. From the throttle-valve 38 the heated and moistened air passes through pipes 39 to the valve-chests 40 of the car-driving motors or engines, the cylinder-castings of which are shown at 40 and 41 in the drawings. The throttle-lever 42 is provided with connections 43, which lead to operating crank-handles 44, located on the respective car-platforms 6. The piping so far described constitutes the air-storage and normal supply connections to the driving-engines through the throttle-valve 38, under the control of the hand-lever 44 on the car-platform. The reheater 34 is charged with superheated water under pressure through a receiving-nozzle $w$ and a pipe $w'$, tapping the fitting 32. The nozzle $w$ is equipped with check-valve $w^2$, and the pipe $w'$ with a shut-off valve or stop-cock $w^3$. The fitting 32 is located between the air-check valve 30 and the reheater 34 and is provided with a shut-off valve or stop-cock $w^4$ between water-pipe $w'$ and the check-valve 30 in the air-pipe 31. Hence by closing stop-valve $w^4$ and opening cock $w^3$ the reheater 34 may be charged with the hot water through the parts $w$ $w'$ $w^2$ and the pipes 33 and 35, as is obvious from an inspection of Fig. 2.

Turning now to the air-pipe connections controlled by the combination-valve, train-valve, and the platform or auxiliary valve, the fitting 28 in the low-pressure dry-air-pipe sections 27 and 29, between the two check-valves 26 and 30, is tapped by what may be conveniently called the "low-pressure train-pipe sections" 45. The said pipe-sections 45 extend to the fittings 46. The said fittings 46 are tapped by three branches. Branch 47 leads to low-pressure gage 48 on car-platform, branch 49 leads to the train-pipe valve 50 on the car-platform, and branch 51 leads to the combination-valve 52 on the car-platform, which controls the supplemental supply or starting connections, the increased pressure or accelerating connections, and the brake-motor connections, as hitherto noted. The branch 51 may be regarded as the supply-pipe to the combination-valve 52. The relations of the train-valve 50 to the train-pipe 45 and to the platform or auxiliary valve 19 will be noted later on after further consideration of the combination-valve 52.

*Pipes controlled by the combination-valve.*— Under the control of the combination-valve 52 the air can pass therefrom through pipe-sections 53 to a fitting 54. The fitting 54 is connected by pipe-sections 55 to fittings 56, which in turn connect by branches 57 and couplings 58 with ports 59 in the cylinder-casting, which are under the control of the main member of the distribution-valves, as best shown in Figs. 26 and 27. The passages 59 in the cylinder-casting are fitted with check-valves 60, which permit the air to pass inward to the cylinder, but prevent the same from passing outward into the pipes. The main member 61 of the distribution-valves 61 and 62 has its admission-ports 63 extended outward on the face of the valve, so as to coöperate with the ports 59 in the seat for the admission of fluid to start the engine when the admission is cut off, through the main supply connections, by the cut-off valve 62, as shown in Figs. 26 and 27. The valve 61 has the usual exhaust-cavity 64. With the piping just noted it is obvious that the air supplied through the supplemental or starting connections 55 can only enter the cylinder under the control of the main member 61 of the distribution-valves, and hence that the air will thereby always be made to enter the cylinder on the proper side of the piston for starting the engines in the right direction. These details for starting are identical with the construction shown in my pending application, hereinbefore identified.

From the combination-valve 52 extend a pair of pipes 65 and 66, which are connected, respectively, to opposite ends of the brake-motor cylinder 68 by couplings or fittings 67. By these pipes 65 and 66, under the control of the combination-valve 52, air may be supplied to one side of the brake-motor piston 69, while the other side is open to exhaust into the atmosphere for setting the brake, and the two pipes 65 and 66 may be thrown into communication with each other and the pressures be equalized on opposite sides of the brake-motor piston for releasing the brakes and holding the same in their released position during all of the time that the combination-valve 52 is in running position. The brake-motor piston 69 is shown in dotted lines in Fig. 2 and has its rod 70 connected with the brake-rigging 72 by link 71. Only a part of the brake-rigging is shown. It is sufficient to note that the piston 69 is moved inward by pressure on its rod or stem side for setting the brake, and that it is moved outward from its innermost or set position to a central position for releasing the brakes and holding the same in their released positions. The difference between the areas exposed to pressure on the opposite sides of the piston 69 insures this releasing movement of the piston 69 when the two pipes 65 and 66 are connected together through the combination-valve 52. The pipe 73 from the combination-valve 52 leads to the atmosphere, as shown in Fig. 6, and coöperates with the pipe 66 in setting the brakes.

From the combination-valve 52 extend pipe-sections 74 to a fitting 75, which is connected by branch pipe 76 to the lower piston-cylinder 77 of the fluid-pressure regulator or reduction-valve 23, as best shown in Fig. 6. This reduction-valve 23 is in point of construction identical with my United States Patent No. 553,851, issued of date February 4, 1896, entitled "Fluid-pressure regulator." It is therefore not deemed necessary to go into the details of this reduction-valve 23. Its construction and action is obvious from an inspection of the sectional view thereof given in Fig. 6 and is fully disclosed in my said prior patent. In my former patent, however, the branch 76 is shown as opening directly to the atmosphere instead of extending through pipe 74 to the combination-valve 52, as herein shown and described. The pipe 74 normally coöperates, through the combination-valve 52, with the low-pressure supply-pipe 51 to maintain low pressure under the piston in the cylinder 77 at the lower end of the reduction-valve 23; but under the control of the combination-valve 52 the said pipe 74 can be cut off from the supply-pipe 51 and be made to connect with the atmospheric pipe 73, so as thereby to open the cylinder 77 for exhaust below the bottom piston of the reduction-valve 23. When this occurs, less area will be available on the low-pressure side of the reduction-valve for closing the same, and hence the air will pass from the high-pressure side to the low-pressure side of said reduction-valve at an increased pressure over the normal or working pressure. Hence under the control of the combination-valve 52 the fluid-pressure regulator or reduction-valve 23 may be made to pass the air at an increased or higher than normal pressure into the working-pressure system, and hence through the throttle 38 to the valve-chests 40 of the engine-driving motors. Air at this increased pressure will then be admitted to the cylinders 41 of the driving-engines under the action of the engine distribution-valves 61 and 62.

The piping from the combination-valve 52, which establishes the connections for doing the three different kinds of work controlled by said valve have now been stated. It should be noted that said combination-valve 52 is supplied with air through the branch pipe 51 and the low-pressure train-pipe 45, which pipe 45 taps the working-pressure system at the fitting 28 between the check-valves 26 and 30, or, otherwise stated, between the reduction-valve 23 and the check 30, which prevents water from backing up into the piping from the reheater. Hence all the air which is distributed through the combination-valve 52 is dry or unmoistened air. This fact is important, because by said arrangement condensation and freezing is avoided in the piping controlled by said combination-valve 52.

*Details of combination - valve.*—Turning now to the details of the combination-valve 52, whereby it is made to control the three sets of pipe connections hitherto described, attention is especially directed to Figs. 5 to 21, inclusive. So far, in tracing the piping, the combination-valve as an entirety has been designated by the numeral 52; but in the detail views now under consideration the said numeral 52 represents the casing within which the valve proper, $a$, is mounted. This casing 52 is composed of two sections bolted together. The lower section receives the various pipes hitherto noted and is provided with a suitable seat for said valve. The pipe-openings in the base or lower section of the casing 52 are designated by the same numbers as the pipes which connect or communicate therewith. The head of the valve $a$ is provided with an upwardly-extended and perforated flange $a'$ and has also a downwardly-extended hollow stem $a^2$, which is centrally seated in the base-section of the casing 52 in proper position to communicate with the supply-passage 51. The upper section of the casing 52 is of the proper form to afford a valve chest or chamber $a^3$ above the valve $a$. The perforated flange $a'$ is of the proper form to receive the lower end of an operating-shaft $a^4$, which extends outward through the neck of the casing 52 and is provided with a suitable operating-handle $a^5$. The perforated flange $a'$ of the valve $a$ is provided with keys $a^6$, which engage with corresponding seats $a^7$ in the lower end of the shaft $a^4$ to afford the wrench action. The shaft $a^4$ is provided with an enlarged part $a^8$, which is ground as a valve to fit a corresponding seat $a^9$ in the casing 52 and form an air-tight joint therewith. The parts $a$ and $a^4$ are held to their respective seats by the air and a suitable spring $a^{10}$, reacting between the same. The handle $a^5$ is provided with a spring-catch $a^{11}$, which is adapted to engage under an annular flange $a^{12}$ on the neck of the upper section of the casing 52 and to engage with vertical notches $a^{13}$ in a deep flange $a^{14}$, directly below the wider flange $a^{12}$, which overhangs the same. The flange $a^{12}$ is provided with a notch $a^{15}$ at one point only, which will permit the hook-like lower end of the detent $a^{11}$ to pass therethrough when brought into vertical registration therewith. The shaft $a^4$ is cut away longitudinally on its protruding part and is provided with a spring-catch $a^{16}$, which when unimpeded is adapted to engage with a lock-notch $a^{17}$ on the inner wall of the upper section of the casing 52, as clearly shown in Fig. 11.

The handle $a^5$ is provided with a key $a^{18}$, projecting radially into the passage $a^{19}$ of the handle, which key $a^{18}$ is adapted to work against the spring-catch $a^{16}$ with a cam action when the handle is in working position with the effect of holding the catch or detent $a^{16}$ in the position shown in Fig. 9, or out of engagement with the casing. Stops $a^{20}$ project radially from the flange $a^{14}$ into the path of the detent $a^{11}$ and serve to limit the rotary movement of the hand-lever $a^5$. From the above-described construction of the handle $a^5$ and the head of the shaft $a^4$ it is obvious that when the handle is on the shaft, as shown in Figs. 7 and 9, the shaft will be free to turn, but when the handle is off the shaft will be locked to the casing. Now, inasmuch as there is only one position in which the detent $a^{11}$ can be made to pass down through the notch $a^{15}$ of the flange $a^{12}$, it follows that the handle cannot be taken off without locking the shaft to the casing and cannot be put on without unlocking the same therefrom. This detail is a point of improvement, inasmuch as thereby the valve-operating shaft $a^4$ and the valve $a$ at one end of the car will be left locked whenever the handle $a^5$ is removed for use by the operator at the other end of the car. The removal of the handle locks the combination-valve in position to blank or cover all the ports or passages controlled thereby. Hence tampering with the idle valve is prevented.

Having regard now to the ports in the valve $a$ for coöperation with the pipe openings or ports in the valve-seat hitherto noted, the same will be most readily understood by reference to Figs. 12 to 21, inclusive. The valve $a$ is provided with one port $b$ extending entirely through the same. It is also provided on its under surface with a segmental cavity $b'$, an irregular somewhat S-shaped cavity $b^2$, and a pair of radial cavities $b^3$ and $b^4$, all as best shown in Fig. 16, which is a bottom plan view of the valve, and in Fig. 14, which is a section on the line $x^2 x^2$ of Fig. 15. The radial cavities $b^3 b^4$ open into the hollow central stem $a^2$ of the valve $a$. In addition to the openings in the valve-seat hitherto noted and marked with the same numbers as the pipes to which they lead it is necessary also to note a small radial cavity $c$ in the said seat for purposes which will presently appear. The action of the combination-valve is intended to be represented in the diagram views, Figs. 17 to 21, which views may be readily understood by noting that the valve is broken through and sectioned where necessary to show the parts and ports or openings which are active in the respective positions of the valve illustrated in the respective views.

Let it be assumed that the car-motor has been stopped and that admission through the main or normal supply connections through the throttle-valve, &c., is cut off by the cut-off member 62 of the distribution-valves 61 and 62 in the engine valve-chests and that it is desired to start the engines. In that event the combination-valve $a$ is thrown into the position shown in Fig. 17. The effect will be to bring the port $b$ of the valve $a$ into registration with the starting pipe or connection 53, thereby permitting the air from the valve-chest $a^3$ of the combination-valve to pass through the starting connections 53 54, &c., to the proper member of the starting-ports 59 in the engine-cylinder casting for starting the engine or engines in the direction required. At the same time the cavity $b^2$ in the combination-valve will connect the by-pass or cavity $c$ in the seat with the pipe 73, leading to the atmosphere, but the cavity $c$ communicates with the accelerator-pipe 74. Hence in this position of the valve (shown in Fig. 17) the pipes 73 and 74 will be connected, thereby opening the small cylinder 77 below the bottom piston of the reducing-valve 23 for exhaust to the atmosphere. This will cause the air to pass from the high-pressure or storage system into the low-pressure or working system at an increased or higher than normal pressure, as hitherto noted. Hence the air admitted to the engines through the starting or supplemental connections will be at the increased pressure, and the air-supply through the throttle-valve and main supply connections to the valve-chests of the engines will also be at the higher pressure. As soon as the car starts the combination-valve may be thrown into the position shown in Fig. 18. In this position the supplemental or starting connections will be cut off, but the accelerator or increased-pressure connections will be maintained, as may be readily seen from an inspection of said view, Fig. 18. The valve would be thrown into this position (shown in Fig. 18) whenever it is desired to use the accelerator or increased-pressure connections at any other time than when starting the engine. The accelerating position shown in Fig. 18 is usually the second position of the valve-lever $a^5$, for the reason that the accelerator or increased pressure is applied after starting "to pick up quick" or speedily get the car under the desired speed. As soon as the desired speed of the car is attained the valve-lever $a^5$ is thrown into the position shown in Fig. 19, which is its normal or running position. When in this position shown in Fig. 19, it will be seen that the supplemental starting connections are cut off, that the accelerating connections are cut off, and that the two brake-motor pipes or connections are thrown into communication through the cavity $b'$ in the combination-valve $a$, as required to release or hold the brakes in their released positions. The said accelerating connections are cut off by reëstablishing the normal condition of things, which is that the supply-pipe 51 shall communicate with the accelerator-pipe 74 through the small radial cavity $b^3$ in the valve and the by-pass cavity $c$ in the seat, thus maintaining low pressure in the pipe 74 and the cylinder 77 beneath the bottom piston of the reducing-valve 23. Under these normal conditions the reducing-valve or fluid-pressure regulator 23 will pass the air from the high-pressure to the low-pressure side at the normal desired working pressure of, say, one hundred and fifty pounds, as hitherto noted.

Whenever it is desired to set the brake for stopping or checking the car the lever $a^5$ is thrown into the position shown in Fig. 20, and when thus set the cavity $b'$ of the combination-valve $a$ will connect the brake-pipe 66 with the atmospheric pipe 73, thereby exhausting from the back of the brake-motor piston 69, and will bring the port or passage $b$ of the combination-valve into registration with the brake-pipe 65, thereby admitting the air to the stem side of the brake-motor piston 69 for setting the brake, as hitherto noted. When the combination-valve is in the brake-setting position, as shown in Fig. 20, the radial cavity $b^4$ of the valve coöperates with the by-pass $c$ in the seat to connect the supply-pipe opening 51 of the valve with the accelerator-pipe 74, so as to maintain the low pressure in the cylinder 77 under the bottom piston of the reducing-valve 23 for maintaining normal pressure in the working systems.

By throwing the valve-lever $a^5$ into the position shown in Fig. 21 all the ports or passages controlled by said valve will be covered or blanked, so as to confine the air from the supply-pipe 51 within the valve-chest chamber $a^3$. The valve takes this position (shown in Fig. 21) when the car has been stopped and the valve-lever $a^5$ is to be removed for use on the combination-valve at the other end of the car, and will be locked in said position when the handle is removed, as hitherto noted.

From the foregoing description it is thought that the construction and the action of the combination-valve 52 for its three several functions—to wit, controlling the supplemental starting connections, the increased pressure or accelerator connections, and the brake-motor connections—have been made perfectly clear and distinct.

*Details of platform and train valve.*—Attention will now be directed to the details of the platform-valve 19 and the train-valve 50, which are best shown in Fig. 5. In tracing the piping with special reference to Figs. 1 and 2 it was noted that the high-pressure air from the storage-reservoirs 15 passed into the platform-valve 19 through pipe 18 and thence through pipe 20 and connections 21 22 to the reducing-valve 23. The casing 19 of the platform-valve is provided with a valve-chest $f$, with which the pipe 18 communicates, as clearly shown in Fig. 5, by a passage numbered the same as the pipe 18 with which it connects. At its mouth this passage 18 is the proper shape to afford a seat $f'$ for a globe-valve $f^2$. This valve $f^2$ is carried by a stem $f^3$, which is screw-threaded near its lower end and works through the cap $f^4$ of the valve-chest $f$ as a nut. The said cap $f^4$ has screw-threaded engagement with the other part of the casing 19 and is provided with a stuffing-box $f^5$, through which the stem $f^3$ passes. The stem $f^3$ is provided at its upper end with a suitable operating-handle $f^6$, as shown in Fig. 1. By this valve $f^2$ it is obvious that the high-pressure air may be locked or confined at will within the storage system on the storage side of the platform-valve 19. The casing 19 of the platform-valve is provided with a suitable seat $h'$ for a needle or auxiliary valve $h^2$, controlling a small passage $h^3$, leading to the pipe-passage 18. The stem of the needle-valve $h^2$ is screw-threaded and works through a corresponding screw-threaded passage in the cap or outer wall of the valve-chest $h$, as shown in Fig. 5. The protruding part of the stem of the valve $h^2$ is of the proper form for the application thereto of a suitable wrench for controlling the same.

The auxiliary-valve chest $h$ connects, by pipe 78, with the casing 50 of the train-pipe valve, as shown best in Fig. 5. The train-pipe-valve casing 50 is provided with a valve chest or chamber $p$, into which the pipe 78 opens and from which the pipe 49, hitherto noted, leads to the fitting 46 of the train-pipe 45. The casing of the train-valve 50 is also provided with a coupling or fitting 79 for connection with trailer-car train-pipe extension 80. The storage-reservoirs on the trailer-car (not shown) would connect with the train-pipe extension 80 through branches (not shown) provided with reducing-valves (not shown) set for the same pressure as the main reducing-valve 23 on the motor-car, and suitable flexible couplings would be provided in the trailer-pipe 80 between the cars, all substantially as disclosed in the pending application of Herman Haupt, Serial No. 550,306, filed May 23, 1895, and allowed May 5, 1896, entitled "Pneumatic railways." The train-valve casing 50 is provided with a valve-seat $p'$ and coöperating valve $p^2$ for controlling the passage from the trailer connections 79 and 80 into the train-valve chest $p$ and the train-pipe branch 49. The said valve $p^2$ extends outward through a nut-cap $p^3$, with which the stem has screw-threaded engagement for coöperation in substantially the same way as the parts $f^4$ and $f^3$ of the platform $f^2$. The stem of the valve $p^2$ also works through a suitable stuffing-box $p^4$ on the nut-cap $p^3$, and the projecting part of the valve-stem is of the proper form for the application thereto of a suitable operating-wrench. By this valve $p^2$ it is obvious that connection may be made to the trailer-pipe or cut off therefrom at will. When a storage-trailer is not used, which is the normal condition of things, the valve $p^2$ is screwed down tight into its closed position.

Having regard to the coöperative action of the platform-valve 19 and the train-valve 50, it should be noted that the auxiliary valve $h^2$ is normally closed and the valve $f^2$ is normally in its open position. In this normal condition of things the high-pressure air from the storage-reservoirs simply passes through the platform-valve casing 19 as it would through an ordinary pipe connection on its way to the reducing-valve. But suppose something should go wrong or get out of order with the reducing-valve 23 or the connections at any point between the platform-valve 19 and the check-valve 26. Then the valve $f^2$ can be screwed down into its closed position and the high-pressure storage system can be tapped through the passage $h^3$ and the pipe 18 by opening the auxiliary valve $h^2$. As this valve $h^2$ is a needle-valve, the high pressure may be reduced thereby sufficiently to admit air into the pipe 78 and the connections therefrom at a sufficiently-reduced pressure to be worked, temporarily, with safety. The high-pressure air thus admitted to the pipe 78 can pass, of course, through the chest $p$ of the train-valve casing 50 to the branch 49 of the train-pipe 45. From the train-pipe 45 this high-pressure air can enter the pipe-sections 27 and 29 and pass thence to the reheater and through the main supply connections under the control of the throttle-valve 38 to the driving-engines. This platform and auxiliary valve therefore afford a means for temporarily drawing a supply from the high-pressure storage system independently of the normally-used reducing-valve 23 for use upon an emergency in case the reducing-valve or other connections should get out of order. This provision might be of extreme importance for running home in case of accident. This auxiliary system makes necessary the use of the two check-valves 26 and 30 in the dry-pipe sections 27 and 29 instead of a single check, as in my former case.

*The safety-valve.*—The working pipe-sections 27 and 29 are tapped between the checks 26 and 30 by a safety-valve $s$, as shown in Figs. 1 and 2. This is a provision against accident from excessive pressure in the working system from any cause, and is especially desirable for insuring safety when employing the above-described auxiliary or high-pressure system or working supply through the needle-valve $h^2$. If for want of the necessary extreme care required the motorman should open said needle-valve too much, the safety-valve will afford the needed relief and prevent the air from passing into the reheater and other parts at a dangerous pressure.

*The low-pressure reservoir.*—The fitting 25 in the working-pressure connections is tapped by a pipe $r$, leading to a reservoir $r'$, which may be called the "low-pressure reserve" or "cushion" reservoir, in constant communication with the working-pressure system. The purpose of this cushion-reservoir $r'$ is to afford an extra supply on the working side of the reduction-valve, ready to meet any sudden variation in the load on the engines without excessive draft on the reduction-valve. Otherwise stated, the reserve reservoir $r'$ in the working connections insures a steadier action of the reduction-valve, and consequently the use of air at more nearly uniform pressure in the car-driving engines.

Figure 22:
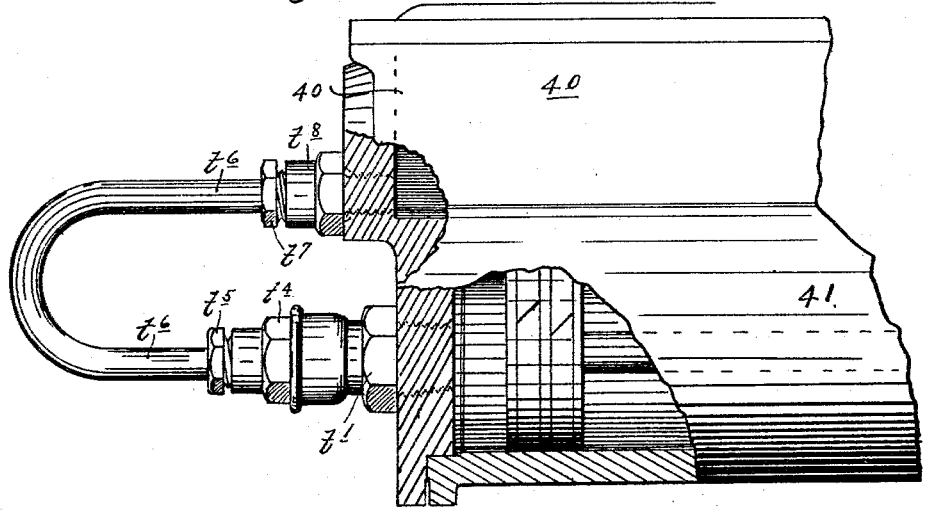
Figure 23:
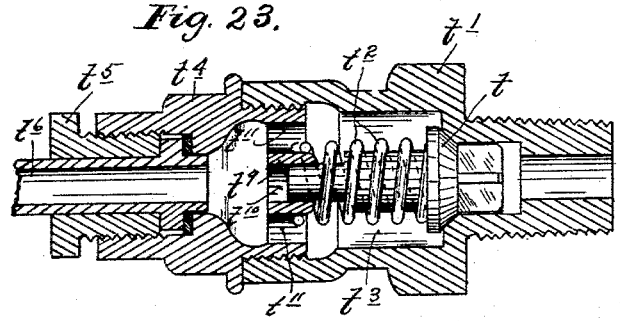
Figure 24:
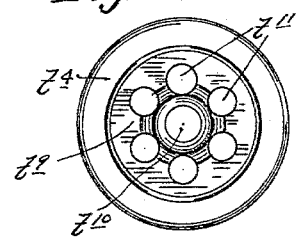
Figure 25:
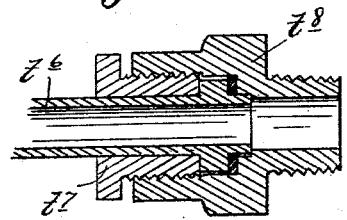

*The cylinder relief-valves.*—It has already been stated that the engine-cylinders are provided with relief-valves, which are piped back into the valve-chest. These details are shown in Figs. 22 to 25, inclusive. The relief-valves $t$ are mounted in suitable casings $t'$, which are screwed into the heads of the cylinders, as shown in Figs. 1 and 22. These valves are held to their seats by springs $t^2$ and pressure on the check-valves within the chests or chambers $t^3$ of the casings $t'$. The casings $t'$ connect by couplings $t^4$ and $t^5$ with pipes $t^6$, which extend to suitable couplings $t^7$ $t^8$, which unite the same to the valve-chests 40. The coupling member $t^4$ is provided with a bridge $t^9$, having a central passage $t^{10}$, which serves as a guide to the outer ends of the stem of the check-valve, and is also provided with a series of perforations $t^{11}$ for the passage of the air or water. The action of these relief-valves will be readily understood. When the water of condensation has accumulated to such an extent within the engine-cylinders as to interfere with the proper action of the same, an excessive pressure will be produced on the check-valves under the outward movements of the pistons, which will cause the valves to open and permit the water to be forced back through the piping into the valve-chest 40. The water will then be taken up or absorbed by the air in the chests and will be carried back with the air into the cylinders under the action of the distribution-valves. I have found by practice that this arrangement will work successfully and that the water can, in this way, be worked off through the exhaust-ports under the control of the distribution-valves. Some such an arrangement is extremely desirable in street-car service with an air-storage motor of the kind herein described, for the reason that otherwise the noise produced under the action of the relief-valves opening directly to the atmosphere would be extremely objectionable on account of the alarm to the passengers which would be occasioned thereby.

*Improved reheater.*—The construction of the hot-water reheater employed on this improved motor was briefly indicated when tracing the piping, but a word further is needed as to its action or advantage. The said reheater is best illustrated in Figs. 3 and 4. By reference thereto it will be seen that the dry cold air supplied through the pipe 33 is distributed through the perforated pipe 35, located near the bottom of the shell 34, with its perforations arranged on the under side only and discharging downward and outward into the lowest level of the water 36. The moistened and heated air is collected by the perforated pipe 37, located at the top of the shell 34 and having its perforations on its upper surface only, so as to receive or collect the heated and moistened air and any steam that may go therewith from above only. The shell 34 is never filled entirely full of water, but only up to about the level shown in Fig. 4. The baffle-plates $34^a$ prevent violent motion or splashing of the water within the shell, and in virtue of the special forms and relative arrangement of the distributer 35 and the collector 37 the reheater is made to do its work of moistening and reheating the air without permitting water—free water—to enter the said pipe 37 or the working connections therefrom controlled by the throttle-valve. This is a material and valuable improvement.

All the parts of my improved air-storage motor-car or locomotive have now been specified so far as deemed necessary to a full understanding of the features of improvement herein disclosed and claimed. The general operation is thought to be clear and distinct from the general statements made by way of introduction and from the stated action of the different parts given in connection with the detailed description thereof.

From the disclosures herein made it must be obvious that a car-motor is provided of high efficiency and of complete equipment for perfect control and for meeting the variety of conditions peculiar to street-railway service.

By actual usage I have demonstrated the practicability and value of the inventions herein disclosed. Motor-cars constructed in accordance with this specification are in extensive use and known as the "Hardie air-motor or street-car system."

What I claim, and desire to secure by Letters Patent of the United States, is as follows:

1. The combination with air-storage reservoirs, wherein the air is stored at comparatively high initial pressure, and an air-engine, wherein the air is used at comparatively low pressure, of an automatic fluid-pressure regulator or reduction-valve, in the main supply connections to said engine, controllable to pass the air from the storage into the working system either at normal or higher than normal working pressure, at will, and supplemental or starting connections to said engine tapping the working-pressure system and controllable at will, whereby air at increased pressure may be supplied to the engine either through said starting connections or said main supply connections as may be desired, substantially as described.

2. The combination with air-storage reservoirs, wherein the air is stored at comparatively high initial pressure, and an air-engine, wherein the air is used at comparatively low pressure, of an automatic fluid-pressure regulator or reduction-valve, in the main supply connections, operative to pass the air from the storage into the working system either at normal or higher than normal pressure, supplemental supply or starting connections to said engine tapping said working-pressure system, and a combination-valve for controlling said pressure-regulator and said starting connections to pass the air to the engine, at increased pressure, either through said starting connections or said main supply connections, at will, substantially as described.

3. In an air-storage motor-car or locomotive, wherein air is stored at comparatively high and is used at comparatively low pressure, the combination with the car-driving engine or engines and a brake-motor, of a fluid-pressure regulator, in the main supply connections, operative to pass the air into the working system either at normal or at higher than normal working pressure, supplemental or starting connections, to said engine or engines, tapping said working-pressure system, brake-motor connections also tapping said working-pressure system, and a combination-valve controlling said pressure-regulator, said starting connections and said brake-motor connections, substantially as described.

4. In an air-storage motor-car or locomotive, wherein air is stored at comparatively high and is used at comparatively low pressure, the combination with the driving engine or engines, of a reduction-valve in the main supply connections, for normally passing the air from the storage to the working-pressure system at the desired reduced pressure, and auxiliary supply connections from said high-pressure storage to said working system, controllable at will, for tapping said high-pressure storage independent of said reduction-valve, upon emergency as in case of accident to the reduction-valve or normal supply connections, substantially as described.

5. In an air-storage motor-car or locomotive, wherein air is stored at comparatively high and used at comparatively low pressure, and is passed through a hot-water reheater, before reaching the engine or engines, the combination with the main or normal supply connections containing a reduction-valve, of a pair of check-valves in the working-pressure connections, between the reduction-valve and the reheater, an auxiliary valve for tapping the high-pressure system, independent of said reduction-valve, and connections from said auxiliary valve tapping said working-pressure connections between said two check-valves, substantially as and for the purposes set forth.

6. The combination with an air-engine, high-pressure storage-reservoirs and a reduction-valve in the main or normal supply connections, of a shut-off valve in said main or normal supply connections on the high-pressure or storage side of the reduction-valve, an auxiliary valve tapping the high-pressure storage system on the reservoir side of said shut-off valve, and connections from said auxiliary valve to the main supply connections on the working or low pressure side of said reduction-valve, substantially as described.

7. In an air-storage motor-car or locomotive, wherein the air is stored at comparatively high, and used at comparatively low pressure and is passed through a hot-water reheater before reaching the engine or engines, the combination with the normal supply connections containing a reduction-valve, of a pair of check-valves in the working-pressure connections between the reduction-valve and the reheater, a shut-off valve in the normal supply connections, on the high-pressure side of the reduction-valve, an auxiliary supply-valve on the storage side of said shut-off valve, for tapping the high-pressure system, independent of the reduction-valve, and auxiliary connections from said auxiliary valve to the working-pressure pipe between said two check-valves, all substantially as and for the purposes set forth.

8. The combination with an air-engine, high-pressure storage-reservoir and a reduction-valve in the main or normal supply connections from said storage-reservoirs to the engine, of an auxiliary valve and connections for tapping said high-pressure storage, independent of said reduction-valve, upon emergency, and a safety-valve in the supply connections to the engine, on the working-pressure side of said reduction-valve, for insuring safety in the use of the auxiliary or high-pressure connections, substantially as described.

9. In an air-storage motor-car or locomotive, the combination with the high-pressure storage-reservoirs and the driving engine or engines, of a reduction-valve in the supply connections from said reservoirs to said engine or engines, a train-pipe tapping the working-pressure system, and a train-valve in said train-pipe provided with means for connecting with a trailer extension or branch of said train-pipe under the control of said train-valve, substantially as described.

10. In an air-storage motor-car or locomotive, the combination with the storage-reservoirs and the engines, of a reduction-valve in the main supply connections, a hot-water reheater between the reduction-valve and the throttle-valve, a pair of check-valves in the working-pressure dry-pipe between the reduction-valve and the reheater, a train-pipe tapping said dry-pipe between said check-valve, a train-valve in said train-pipe provided with connections for utilizing storage from a trailer, under the control of said valve, a shut-off valve in the high-pressure connections, on the storage side of said reduction-valve, an auxiliary valve for tapping the high-pressure system on the storage side of said shut-off valve, connections from said auxiliary valve to said train-valve, and a safety-valve tapping said dry-pipe between said check-valve, all substantially as and for the purposes set forth.

11. In an air-storage motor-car or locomotive, the combination with the engines and storage-reservoirs, of a hot-water reheater, through which the air is passed before entering the engine or engines, comprising a suitable shell or casing provided with baffle-plates, a perforated distributing-pipe near the bottom of the same, with its perforations arranged to deliver the dry and cold air downward and outward into the hot water, near the lowest level thereof, and a perforated collecting-pipe, at or near the top of said shell, and having its perforations arranged to receive from above, all substantially as and for the purposes set forth.

12. In an air-storage motor-car, the combination with the storage-reservoirs and a hot-water air-reheater, of a reduction-valve, a brake-motor, a brake-valve, a check-valve in the working-pressure pipe between said reduction-valve and said reheater, and a supply-pipe for said brake-motor, tapping said working-pressure pipe, at a point between said reduction-valve and said check-valve, whereby dry air only is admitted to the brake-motor and the piping for the same.

13. In an air-storage motor-car, the combination with the storage-reservoirs, driving-engines, reduction-valve, hot-water air-reheater and brake-motor, of a check-valve in the working-pressure pipe between the reheater and reduction-valve, supplemental or starting connections for said engines, and the combination-valve controlling the brake-motor connections and said supplemental or starting connections and provided with a supply-pipe tapping said working-pressure pipe between said check-valve and said reduction-valve, whereby dry air only is admitted to the pipes controlled by said combination-valve, substantially as described.

In testimony whereof I affix my signature in presence of two witnesses.

ROBT. HARDIE. [L. S.]

Witnesses:
HUGH ROSE, [L. S.]
E. G. OSTERMANN. [L. S.]